(12) United States Patent
Seto

(10) Patent No.: US 10,897,551 B2
(45) Date of Patent: Jan. 19, 2021

(54) DOCUMENT READING DEVICE AND IMAGE FORMING APPARATUS

(71) Applicant: KYOCERA Document Solutions Inc., Osaka (JP)

(72) Inventor: Akifumi Seto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/727,808

(22) Filed: Dec. 26, 2019

(65) Prior Publication Data

US 2020/0213463 A1 Jul. 2, 2020

(30) Foreign Application Priority Data

Dec. 28, 2018 (JP) ................................. 2018-247707
Dec. 28, 2018 (JP) ................................. 2018-247709

(51) Int. Cl.
*H04N 1/00* (2006.01)
*G06K 9/00* (2006.01)

(52) U.S. Cl.
CPC ..... *H04N 1/00811* (2013.01); *G06K 9/00456* (2013.01); *H04N 1/0035* (2013.01);
(Continued)

(58) Field of Classification Search
CPC ........... H04N 1/00689; H04N 1/00692; H04N 1/00694; H04N 1/00013; H04N 1/00037; H04N 1/0005; H04N 1/00063; H04N 1/0035; H04N 1/00567; H04N 1/00588; H04N 1/00591; H04N 1/00602; H04N 1/00612; H04N 1/00615; H04N 1/0062; H04N 1/00631; H04N 1/00649;
(Continued)

(56) References Cited

U.S. PATENT DOCUMENTS

2004/0070142 A1* 4/2004 Kawasaki ................ B65H 7/12
271/262
2007/0081212 A1* 4/2007 Tonami ................ H04N 1/0075
359/197.1

(Continued)

FOREIGN PATENT DOCUMENTS

JP 2007-281777 A 10/2007
JP 2017-052593 A 3/2017

*Primary Examiner* — Negussie Worku
(74) *Attorney, Agent, or Firm* — Studebaker & Brackett PC

(57) ABSTRACT

A document reading device includes an image reading part, a document conveying part, an operation display part, an overlap detecting part and a controlling part. The overlap detecting part detects overlap of a document conveyed to the image reading part. When the overlap detecting part detects the overlap, if an overlap image corresponding to the overlap in the image data obtained by the image reading part matches with a predetermined preservation image, the controlling part decides that the overlap is not double feed to continue the scanning operation. If the overlap image does not match with the predetermined preservation image, the controlling part decides that the overlap is the double feed, stops the scanning operation, and, if user judgement that the overlap is not the double feed is inputted in accordance with operation of the operation display part, stores the preservation image on the basis of the overlap image.

8 Claims, 12 Drawing Sheets

(52) U.S. Cl.
CPC ..... *H04N 1/00328* (2013.01); *H04N 1/00596* (2013.01); *H04N 1/00734* (2013.01); *H04N 1/00779* (2013.01)

(58) Field of Classification Search
CPC ........... H04N 1/00652; H04N 1/00657; H04N 1/00681; H04N 1/00705; H04N 1/00782; H04N 1/00915; H04N 1/121; H04N 1/193; H04N 1/2032; H04N 1/3263; H04N 2201/0081; H04N 1/00328; H04N 1/00596; H04N 1/00724; H04N 1/00726; H04N 1/00734; H04N 1/0075; H04N 1/00771; H04N 1/00779; H04N 1/00803; H04N 1/00811; H04N 1/00824; H04N 1/00925; H04N 1/047; H04N 1/12; H04N 1/192; H04N 1/203; H04N 1/3873; B65H 2301/132; B65H 2301/33312; B65H 29/00; B65H 43/00; B65H 85/00; G03G 15/234; G03G 15/60; G03G 15/6508; G03G 15/6511; G03G 15/6529; G03G 2215/00177; G03G 2215/00189; G03G 2215/00333; G03G 2215/0035; G03G 2215/00548; G03G 2215/00738; G06K 9/00456
USPC .......................................................... 358/474
See application file for complete search history.

(56) References Cited

U.S. PATENT DOCUMENTS

| | | | | |
|---|---|---|---|---|
| 2008/0284093 | A1* | 11/2008 | Itoh | B65H 5/062 271/262 |
| 2012/0262766 | A1* | 10/2012 | Ishii | H04N 1/00692 358/498 |
| 2012/0307282 | A1* | 12/2012 | Ishikawa | B65H 7/125 358/1.14 |
| 2013/0001852 | A1* | 1/2013 | Ogasawara | B65H 7/125 271/3.14 |
| 2013/0156291 | A1* | 6/2013 | O'Neill | G06K 9/186 382/140 |
| 2013/0321886 | A1* | 12/2013 | Adachi | H04N 1/00602 358/498 |
| 2015/0156357 | A1* | 6/2015 | Yabe | H04N 1/047 358/498 |
| 2015/0239695 | A1* | 8/2015 | Noda | B65H 3/5261 271/265.01 |
| 2016/0224875 | A1* | 8/2016 | Yamaguchi | H04N 1/00204 |
| 2016/0347563 | A1* | 12/2016 | Takuwa | B65H 3/06 |
| 2017/0094088 | A1* | 3/2017 | Murata | H04N 1/00588 |
| 2017/0111524 | A1* | 4/2017 | Tajima | H04N 1/00037 |
| 2019/0082067 | A1* | 3/2019 | Tanigami | H04N 1/00708 |
| 2019/0218047 | A1* | 7/2019 | Miyazawa | H04N 1/00689 |

* cited by examiner (FIRST PAGE)

(SECOND PAGE)

(THIRD PAGE)

(FOURTH PAGE)

(FIRST PAGE)

(SECOND PAGE)

(THIRD PAGE)

(FOURTH PAGE)

DOCUMENT READING DEVICE AND IMAGE FORMING APPARATUS

INCORPORATION BY REFERENCE

This application is based on and claims the benefit of priority from Japanese Patent application No. 2018-247709 filed on Dec. 28, 2018, and Japanese Patent application No. 2018-247707 filed on Dec. 28, 2018, the entire contents of which are incorporated herein by reference.

BACKGROUND

The present disclosure relates to a document reading device performing scanning operation, such as document conveying and image reading, and an image forming apparatus including this document reading device.

An image forming apparatus, such as a multifunction peripheral, includes a document reading device performing scanning operation, such as document conveying and image reading. The document reading device includes an image reading part, such as a scanner reading an image from a document, and a document conveying part conveying the document one by one to the image reading part.

Conventionally, a sheet conveying device as an example of the document conveying part interrupts conveying and reading of the document when double feed of the document is detected by a double feed sensor. For example, if the document in a conveying path is re-placed on a document tray, the sheet conveying device displays a screen for a user to select disabling detection of double feed and restarting a job or maintaining enable of detection of double feeding and restarting a job.

Conventionally, in the document conveying device, if double feed of the document is caused, an image may be missed by reading an image from the document in an overlapped state. By contrast, when overlap of the document is detected as double feed, scanning operation, such as document conveying and image reading, is stopped. At this time, for example, the user checks the document to which double feed is detected, and decides adopting of the image read from this document and continuing the scanning operation of the following document, or re-performing of the scanning operation of the document to which double feed is judged. For example, the above-mentioned document conveying part can set whether or not detection of double feed is performed with regard to the document to be restarted, when double feed is detected by a double feed detecting function.

Incidentally, scanning operation of the document may be performed in a state that a tag paper is stuck on the document, and then, the conventional document reading device detects the tag paper stuck on the document as double feed. Therefore, whenever the document with the stuck tag paper is conveyed, the scanning operation is stopped and the user must check the document. By contrast, in the above-mentioned document conveying part, in a case of the document to which double feed is detected due to the stuck tag paper, if not-performing of detection of double feed with regard to the document to be restarted is set, re-detection of double feed is restrained. However, if the tag papers are respectively stuck on a plurality of the documents, for each document with the stuck tag paper, double feed is detected, the scanning operation is stopped and the user must check the document. Therefore, the scanning operation for all the plurality of documents takes time and labor of the user is required.

Moreover, conventionally, a document feeding device as an example of the document conveying part includes a double feed sensor, a driving part and a controlling part. The double feed sensor detects double feed of the document to output a double feed detection signal when the overlapped document is conveyed. The driving part reciprocates the double feed sensor in a direction orthogonal to a conveying direction of the document. The controlling part controls the driving part and decides double feed of the document on the basis of the double feed detection signal detected by the double feed sensor. In addition, the controlling part decides occurrence of double feed of the document when the double feed detection signal is detected by a width wider than a predetermined value in a width direction orthogonal to the conveying direction of the document.

However, if the above-mentioned document conveying part decides occurrence of double feed of the document when double feed of the width wider than the predetermined value in the width direction orthogonal to the conveying direction of the document is detected, because the double feed sensor is then reciprocated in the width direction, detection of double feed takes time. Moreover, because it is necessary to provide the driving part for moving the double feed sensor, a cost is increased.

SUMMARY

A document reading device of the present disclosure includes an image reading part, a document conveying part, an operation display part, an overlap detecting part and a controlling part. The image reading part reads a document in scanning operation to obtain image data. The document conveying part conveys the document to the image reading part in the scanning operation. The operation display part receives operation of a user. The overlap detecting part detects overlap of the document conveyed to the image reading part. When the overlap detecting part detects the overlap of the document, in a case where an overlap image corresponding to the overlap of the document in the image data obtained from the document by the image reading part matches with a predetermined preservation image, the controlling part decides that the overlap of the document is not double feed to continue the scanning operation. On the other hand, in a case where the overlap image does not match with the predetermined preservation image, the controlling part decides that the overlap of the document is the double feed, stops the scanning operation, and further, if user judgement that the overlap of the document is not the double feed is inputted in accordance with operation of the operation display part, stores the preservation image on the basis of the overlap image.

Moreover, a document reading device of the present disclosure includes an image reading part, a document conveying part, an overlap detecting part and a controlling part. The image reading part reads a document in scanning operation to obtain image data. The document conveying part conveys the document to the image reading part in the scanning operation. The overlap detecting part detects overlap of the document conveyed to the image reading part. When the overlap detecting part detects the overlap of the document, in a case where an overlap image corresponding to the overlap of the document in the image data obtained from the document by the image reading part is not a color image other than white and black, the controlling part decides that the overlap of the document is double feed. On the other hand, in a case where the overlap image is the color image other than white and black, the controlling part decides that the overlap of the document is not the double feed.

An image forming apparatus of the present disclosure includes any one of the document reading devices as described above, and an image forming part forming an image.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
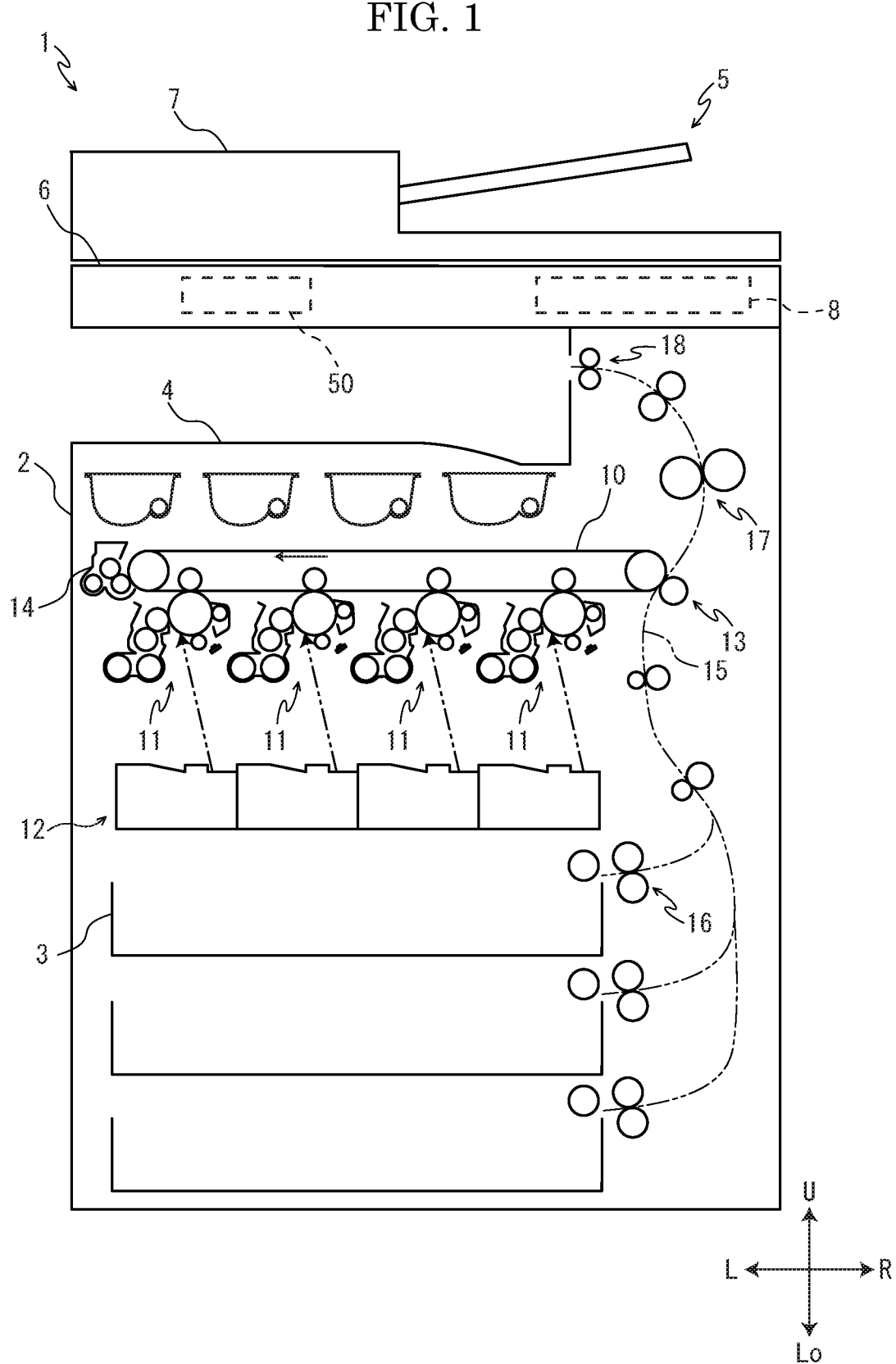
FIG. 1 is a sectional view schematically showing a multifunction peripheral according to a first embodiment of the present disclosure.

First, entire structure of a multifunction peripheral 1 (an image forming apparatus) according to a first embodiment of the present disclosure will be described with reference to FIG. 1. Hereinafter, for convenience of description, it will be described so that the front side of the multifunction peripheral 1 is positioned at the near side on a paper sheet of FIG. 1. Arrows L, R, U and Lo in each FIG respectively indicate a left side, a right side, an upper side and a lower side of the multifunction peripheral 1.

The multifunction peripheral 1 includes a roughly box-formed apparatus body 2. In a lower part of the apparatus body 2, a plurality of sheet feeding cartridges 3 storing sheets are provided. In an in-body space of an upper part of the apparatus body 2, an ejected sheet tray 4 is provided.

Figure 2:
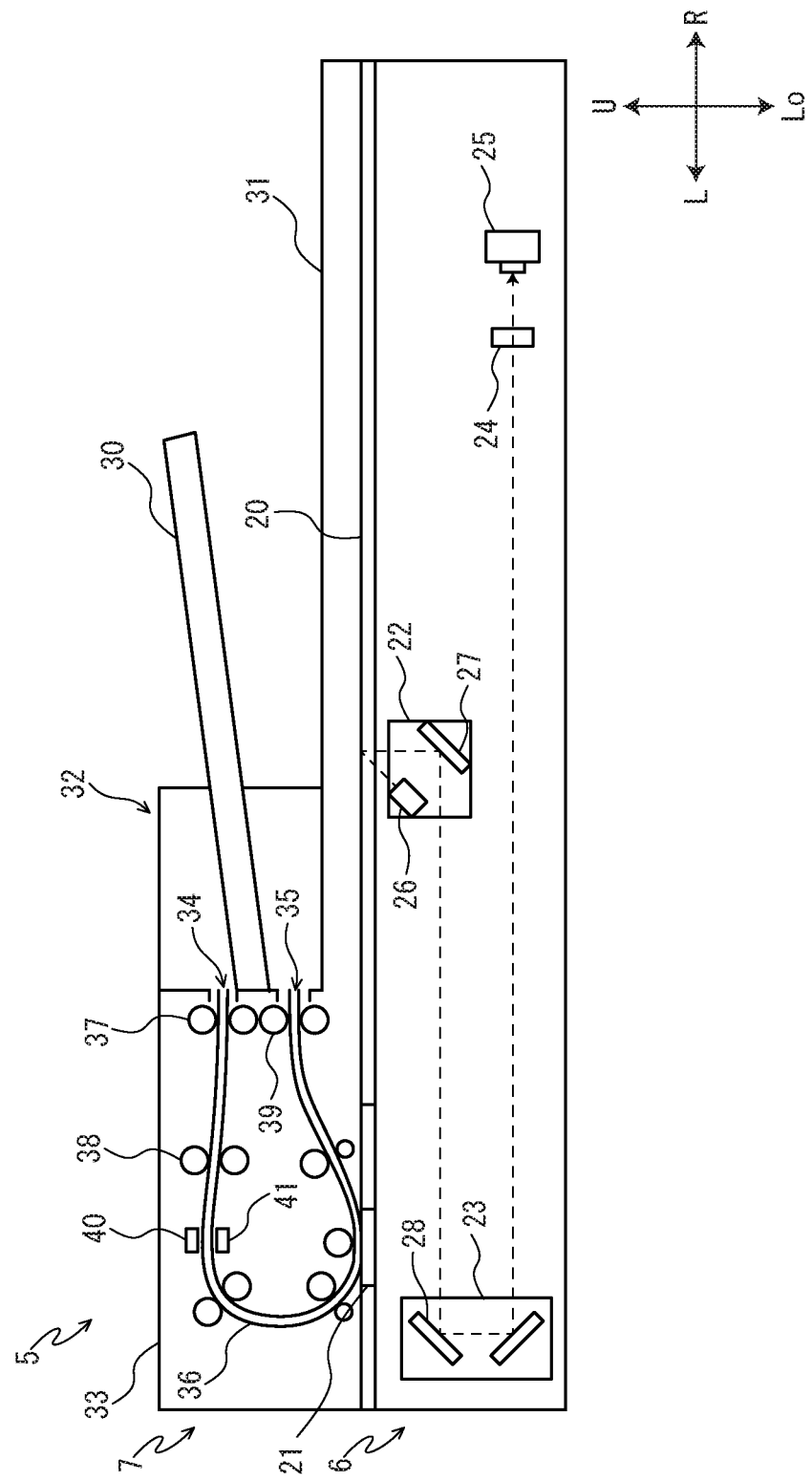
FIG. 2 is a sectional view schematically showing a document reading device of the multifunction peripheral according to the first embodiment of the present disclosure.

In the upper part of the apparatus body 2, a document reading device 5 performing scanning operation, such as document conveying and image reading. The document reading device 5 includes, as shown in FIGS. 1 and 2, an image reading part 6 reading an image from a document and a document conveying part 7 conveying the document to the image reading part 6. In the image reading part 6 and the document conveying part 7, a conveying direction of the document is along left and right directions. Hereinafter, it will be described so that a longitudinal direction of the document is along the conveying direction and a width direction of the document is along a direction orthogonal to the conveying direction. Details of the image reading part 6 and the document conveying part 7 are described later.

Further, in the upper part of the apparatus body 2, an operation display part 8 (an operation part) is attached at a front side. The operation display part 8 includes, for example, operation keys (the operation part), such as ten keys, a start key, a system menu key, a transmission key and a copy key, and a display device, such as a touch panel, to receive operation input from a user.

In a central part of the apparatus body 2, an intermediate transferring belt 10 of an image carrier is windingly stretched among a plurality of conveying rollers. At a lower side of the intermediate transferring belt 10, four image forming parts 11 forming the image are provided for respective toner colors (for example, four colors of yellow, magenta, cyan and black). At a lower side of the four image forming parts 11, an exposing part 12 is provided. At a right end of the intermediate transferring belt 10, a secondary transferring part 13 is provided and, at a left end of the intermediate transferring belt 10, a cleaning unit 14 for cleaning the intermediate transferring belt 10 is provided. The secondary transferring part 13 is composed of a part at a right end side of the intermediate transferring belt 10 and a secondary transferring roller.

In each image forming part 11, a photosensitive drum as an image carrier is rotatably provided. At the periphery of the photosensitive drum, a charging part, a developing part, a primary transferring part, a static eliminating part and a cleaning part are arranged in a sequential order of electrophotographic process. At an upper side of developing parts of the image forming parts 11, toner containers corresponding to respective image forming parts 11 are provided for the respective toner colors (for example, four colors of yellow, magenta, cyan and black). Each toner container contains the toner of each color.

At a right part in the apparatus body 2, a conveying path 15 of the sheet used for image forming is provided. At an upstream part of the conveying path 15, a plurality of sheet feeding parts 16 are provided for the respective sheet feeding cartridges 3. At a middle stream part of the conveying path 15, the above-described secondary transferring part 13 is provided. At a downstream part of the conveying path 15, a fixing device 17 is provided and, at a downstream end of the conveying path 15, a sheet ejecting part 18 is provided.

Next, an image forming operation of the multifunction peripheral 1 will be described. In the multifunction peripheral 1, image data is inputted from the image reading part 6 or an external computer. In each image forming part 11, the photosensitive drum is electrically charged by the charging part, and then, exposed on the basis of the image data by the exposing part 12, and thereby, an electrostatic latent image is formed on the photosensitive drum. The electrostatic latent image on the photosensitive drum is developed for a toner image of each color by the developing part. The toner image on the photosensitive drum is primarily transferred to a surface of the intermediate transferring belt 10 by the primary transferring part. The four image forming parts 11 sequentially perform the above-described operation, and thereby, a toner image of full color (a color toner image) is formed on the intermediate transferring belt 10. The color toner image is supplied to a secondary transferring part 13 at a predetermined secondary transfer timing by rotation of the intermediate transferring belt 10.

On the other hand, a sheet stored in the sheet feeding cartridge 3 is picked up by the sheet feeding part 16, and then, conveyed on the conveying path 15. Subsequently, the sheet on the conveying path 15 is conveyed to the secondary transferring part 13 at the predetermined secondary transfer timing described above. In the secondary transferring part 13, the color toner image on the intermediate transferring belt 10 is secondarily transferred to the sheet. The sheet having the secondarily transferred color toner image is conveyed to a downstream side on the conveying path 15 and, after the color toner image is fixed to the sheet by the fixing part 17, the sheet is ejected from the sheet ejecting part 18 to the ejected sheet tray 4.

Next, the image reading part 6 will be described. The image reading part 6 is arranged at an upper side in the in-body space of the apparatus body 2 and includes, as shown in FIG. 2, a platen glass 20 being a document table and a reading slit glass 21. The reading slit glass 21 is arranged at a left side and the platen glass 20 is arranged at a right side from the reading slit glass 21. Moreover, the image reading part 6 includes an optical scanning unit 22, a reflecting unit 23, a light collecting lens 24 and an image picking-up part 25, such as a charge-coupled device (CCD).

The optical scanning unit 22 has a light source 26 irradiating a light toward the document on the platen glass 20 or the reading slit glass 21 and a reflection mirror 27 directing the light reflected by the document toward the reflecting unit 23. The reflecting unit 23 has a plurality of reflection mirrors 28. The optical scanning unit 22 is formed in a long shape elongated in a main (horizontal) scanning direction (forward and backward directions) and is configured so as to move in a sub (vertical) scanning direction (left and right directions). The reflecting unit 23 is configured so as to move in accordance with movement of the optical scanning unit 22 so that an optical path length from the document to the light collecting lens 24 is kept always constant. The light collecting lens 24 and the image picking-up part 25 are fixedly attached at a right side.

In the image reading part 6, in case of reading the image from the document placed on the platen glass 20, the optical scanning unit 22 reads the image from the document while shifting a reading position by moving from the left side to the right side (in the sub scanning direction). At this time, the optical scanning unit 22 irradiates the light by the light source 26 toward the document on the platen grass 20 and makes the reflected light from the document incident to the image picking-up part 25 via the reflecting unit 23 and the light collecting lens 24. The image picking-up part 25 picks up the image of the document by performing photoelectric conversion on the basis of the reflected light from the document. Subsequently, the image reading part 6 scans the document placed on the platen glass 20 from a leading end to a trailing end to create image data.

Moreover, in the image reading part 6, in case of reading the image from the document conveyed from the document conveying part 7, the optical scanning unit 22 reads the image from the document at a reading position fixedly determined to a position corresponding to the reading slit glass 21. At this time, the optical scanning unit 22 irradiates the light by the light source 26 toward the document on the reading slit glass 21 and makes the reflected light from the document incident to the image picking-up part 25 via the reflecting unit 23 and the light collecting lens 24. The image picking-up part 25 picks up the image of the document by performing photoelectric conversion on the basis of the reflected light from the document. Subsequently, the image reading part 6 scans the document passing on the reading slit glass 21 from a leading end to a trailing end to create image data.

Incidentally, the image reading part 6 transmits the created image data to a controlling part 50 (refer to FIG. 3) of the multifunction peripheral 1. As setting condition of image reading of the multifunction peripheral 1 or the image reading part 6, monochrome image reading or color image reading is set, and then, the image reading part 6 reads a color image to obtain color data (RGB data). A monochrome image is created by binarization processing and others of the color image.

Next, the document conveying part 7 will be described. The document conveying part 7 is arranged above the image reading part 6, has a document conveying function, and is openably/closably attached as a cover member covering the platen glass 20 (or an upper face of the apparatus body 2) of the image reading part 6. The document conveying part 7 includes, as shown in FIG. 2, a supply tray 30 on which the document before image reading is placed, an ejection tray 31 on which the document after image reading is ejected, and a conveying mechanism 32 feeding the document on the supply tray 30 to the ejection tray 31 via the reading position corresponding to the reading slit glass 21. The conveying mechanism 32 is arranged at the left side so as to correspond the reading slit glass 21, the supply tray 30 is extended from an upper part of the conveying mechanism 32 to the right side, and the ejection tray 31 is extended from a lower part of the conveying mechanism 32 to the right side.

The supply tray 30 is formed to incline slightly downward from its right end toward the conveying mechanism 32. An upper face of the supply tray 30 is a placement face on which a plurality of documents can be placed and, on the placement face, a pair of guides restricting a position in the width direction of the document are provided so as to be slidable in the width direction.

The ejection tray 31 is formed by a part of a base part of the document conveying part 7 covering the upper face of the apparatus body 2, and the base part of the document conveying part 7 is formed with the same outer diameter as the apparatus body 2.

The conveying mechanism 32 is surrounded by a cover 33, and then, in an upper part of a right face of the cover 33, a supply port 34 opened at a position corresponding to the supply tray 30 is formed and, in a lower part of the right face of the cover 33, an ejection port 35 opened at a position corresponding to the ejection tray 31 is formed. The conveying mechanism 32 has a conveying path 36 inside the cover 33, and the conveying path 36 is arranged so as to be extended from the supply port 34 to the left side, to be curved downward at the left side, to be further bent to the right side, to pass through the reading position corresponding to the reading slit glass 31, and to be extended to the ejection port 35. The conveying mechanism 32 includes a supplying roller 37, a plurality of conveying rollers 38, an ejecting roller 39, a document detecting part 40 and an overlap detecting part 41 along the conveying path 36.

The supplying roller 37 is provided so as to be rotatable in the vicinity of the supply port 34, and supplies the documents on the supply tray 30 one by one by rotating. The ejecting roller 39 is provided so as to be rotatable in the vicinity of the ejection port 35, and ejects the document from the conveying path 36 to the ejection tray 31 by rotating. The plurality of conveying rollers 38 are rotatably arranged at intervals between the supplying roller 37 and the ejecting roller 39 on the conveying path 36. The supplying roller 37, the plurality of conveying rollers 38 and the ejecting roller 39 are driven and rotated by rotation driving force transmitted from a driving part controlled by the controlling part 50 (refer to FIG. 3).

The document detecting part 40 detects the document conveyed on the conveying path 36, and is composed of an optical sensor including a light emitting part and a light receiving part. The document detecting part 40 outputs a detection signal indicating a result detected by the document detecting part 40, for example, outputs an ON signal in a case of detecting the document or an OFF signal in a case of not detecting the document. The document detecting part 40 is arranged at any position along the conveying path 36, for example, a plurality of document detecting parts 40 may be respectively arranged at different conveying positions on the conveying path 36 so as to detect the document at the respective conveying positions.

The document detecting part 40 starts to detect the document after the document conveying part 7 starts to convey the document, and then, detects the document from the leading end to the trailing end. For example, the document detecting part 40 is arranged at an upstream side from the reading position corresponding to the reading slit glass 21 in the conveying direction of the conveying path 36, and obtains an entry timing of the document to the reading position, i.e. a reading start timing, by detecting the leading end of the document entering the reading position. Moreover, the document detecting part 40 is arranged at a downstream side from the reading position corresponding to the reading slit glass 21 in the conveying direction of the conveying path 36, and obtains an exit timing of the document from the reading position, i.e. a reading end timing, by detecting the trailing end of the document exiting from the reading position.

The overlap detecting part 41 is arranged at a predetermined position between the supplying roller 37 and the reading position corresponding to the reading slit glass 21 on the conveying path 36. The overlap detecting part 41 detects overlap of the document conveyed on the conveying path 36, for example, is composed of an ultrasonic sensor or the like. The overlap detecting part 41 detects the overlap of a few documents or the overlap of the document and a tag paper stuck on the document, and outputs a detection signal indicating a result detected by the overlap detecting part 41, for example, to output an ON signal in a case of detecting the overlap of the document or an OFF signal in a case of not detecting the overlap of the document. Incidentally, a plurality of overlap detecting parts 41 may be respectively arranged at intervals in the width direction so as to detect the overlap of the document over the width direction.

The overlap detecting part 41 is arranged so as to detect the overlap of the document at a predetermined detecting position in the conveying direction, for example, is provided so that the detecting position is equal to a detecting position of the document detecting part 40 at the upstream side from the reading position. And then, the overlap detecting part 41 detects the overlap of the document, after the document conveying part 7 starts to convey the document, until the document detecting part 40 detects the trailing end of the document after detecting the leading end of the document.

Figure 3:
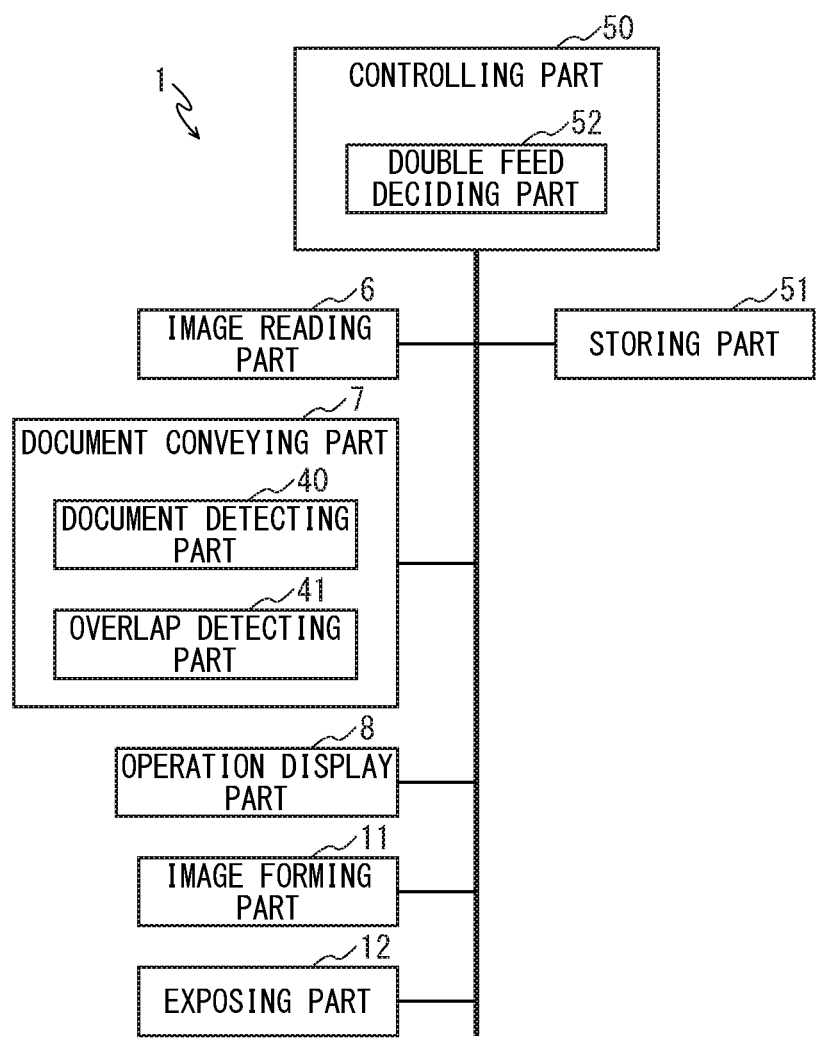
FIG. 3 is a block diagram showing electric structure of the multifunction peripheral according to the first embodiment of the present disclosure.

Next, electric structure of the above-described multifunction peripheral 1 will be described with reference to FIG. 3. The multifunction peripheral 1 includes a controlling part 50 composed of a central processing unit (CPU) or the like, and a storing part 51 composed of a ROM, a RAM and others inside the apparatus body 2.

Figure 4:
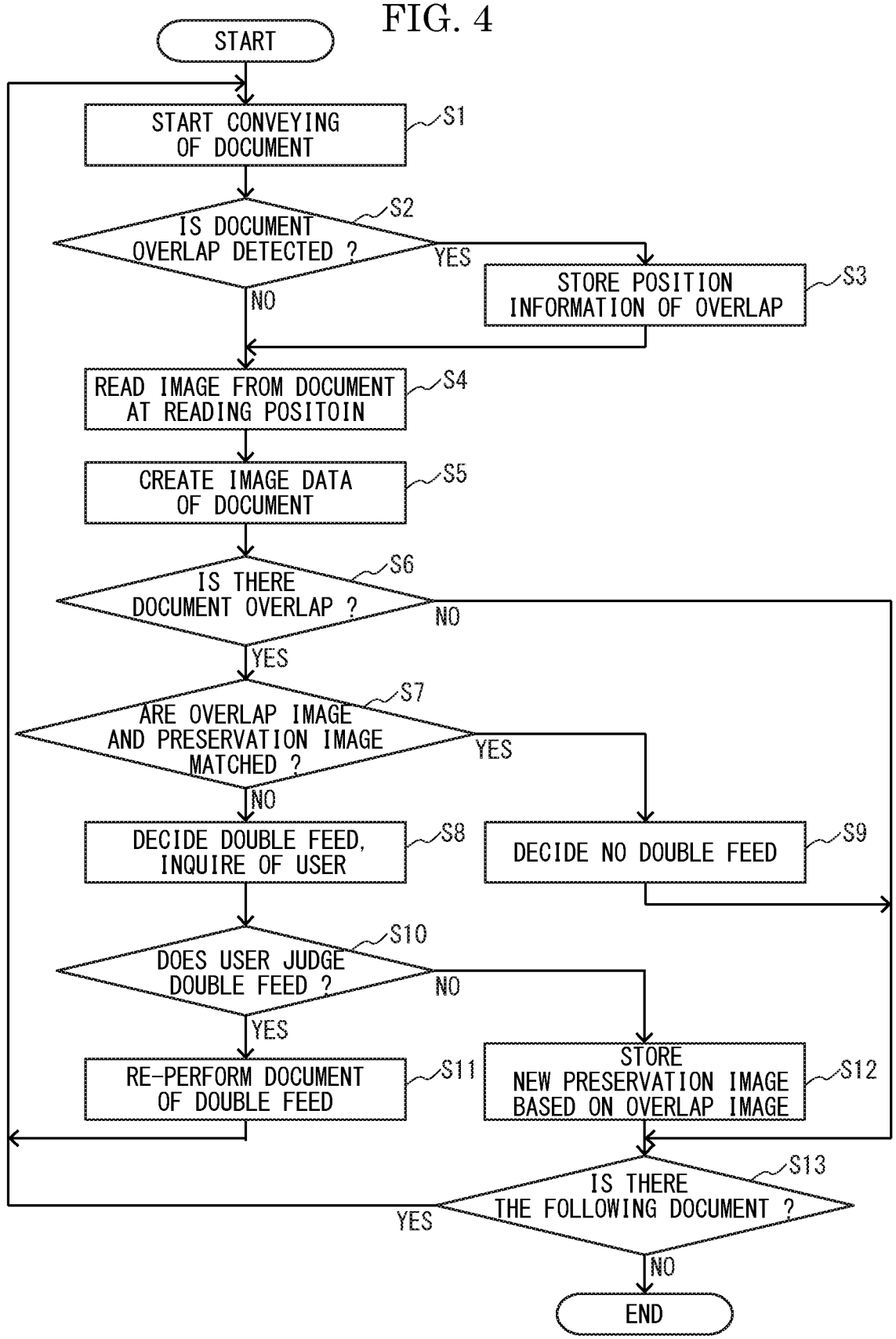
FIG. 4 is a flow chart showing scanning operation in the multifunction peripheral according the first embodiment of the present disclosure.

The controlling part 50 controls each component connected to the controlling part 50 on the basis of control program and control data stored in the storing part 51. The controlling part 50 is connected to each part of the multifunction peripheral 1, such as the image reading part 6, the document conveying part 7, the operation display part 8, the image forming parts 11 and the exposing part 12 and controls the scanning operation, such as document conveying in the document conveying part 7 and image reading in the image reading part 6. FIG. 4 shows a flow chart indicating the scanning operation. In the scanning operation of one job, image reading of a plurality of documents is automatically performed and, when image reading of all the documents is completed, one image data file is created so as to collectively include respective image data of the documents.

Moreover, the controlling part 50 works as a double feed deciding part 52 by executing the program stored in the storing part 51. Double feed deciding in the double feed deciding part 52 is included in the scanning operation. In addition, in the storing part 51, a preservation image used for double feed deciding is stored. Until user judgement described later is carried out, the preservation image is not yet stored, but when user judgement is carried out, one preservation image may be stored or a plurality of preservation images may be stored. Incidentally, the carrying out may be inputted from an external computer or an external memory and stored in advance.

The double feed deciding part 52 grasps passage of the document at the detecting position of the overlap detecting part 41 on the basis of the detection signal of the document detecting part 40 at the upstream side from the reading position. The double feed deciding part 52 measures an elapsed time after the leading end of the document is passed through the detecting position of the overlap detecting part 41, and calculates a distance from the leading end of the document to the detecting position in the conveying direction (a longitudinal direction) on the basis of the elapsed time, i.e., calculates position information on the document corresponding to the detecting position of overlap detecting part 41.

Moreover, after conveying of the document is started (step S1 in FIG. 4), the double feed deciding part 52 grasps the overlap of the document on the basis of the detection signal of overlap detecting part 41 and, when the overlap is detected (step S2: YES in FIG. 4), stores the position information (positions in the width direction and the longitudinal direction) of the overlap in the storing part 51 (step S3 in FIG. 4). Incidentally, the position information in the longitudinal direction is calculated as described above, and the position information in the width direction is grasped in accordance with which overlap detecting part 41 among the plurality of overlap detecting parts 41 arranged side by side in the width direction detects the overlap. In a case where the overlaps are continuously detected, the double feed deciding part 52 may decide a plurality of continuing overlaps as one overlap.

Further, when, with regard to one document (irrespective of whether or not double feed is caused), document conveying in the document conveying part 7 and image reading in the image reading part 6 are completed and the image data is created (steps S4 and S5 in FIG. 4), in a case where the overlap is detected from the document (step S6: YES in FIG. 4), the double feed deciding part 52 decides on the basis of the image data whether or not the overlap of the document is applicable to the double feed. At this time, the double feed deciding part 52 calculates overlap position on the image data corresponding to the overlap on the basis of the position information of the overlap stored in the storing part 51. Incidentally, in a case where the plurality of continuing overlaps are detected, the position information of the overlap at the center may be set as the overlap position.

The double feed deciding part 52 decides whether or not partial image data at the overlap position (an overlap image) matches with the preservation image stored in the storing part 51 (step S7 in FIG. 4). Incidentally, the overlap image may be only a pixel at the overlap position, or may include, in addition to the pixel at the overlap position, pixels within a predetermined range in the conveying direction and the width direction around the overlap position. The preservation image is stored on the basis of the previous overlap image in accordance with user judgement as described later, and may be created by extracting a part of the overlap image or may be created by applying the overlap image as it is.

For example, in a case where the tag paper stuck on the document is detected as the overlap, the preservation image on the basis of the overlap image designates an image corresponding to the tag paper. The tag paper is often colored with chromatic color other than white and black against the document colored with white or black in order to be distinguished from the document, and the overlap due to the tag paper is detected by a color image other than white and black. The image corresponding to the tag paper is designated by an image painted out with chromatic color, an image having a high ratio of chromatic color, an image having a regular pattern of chromatic color or the like.

Figure 5:
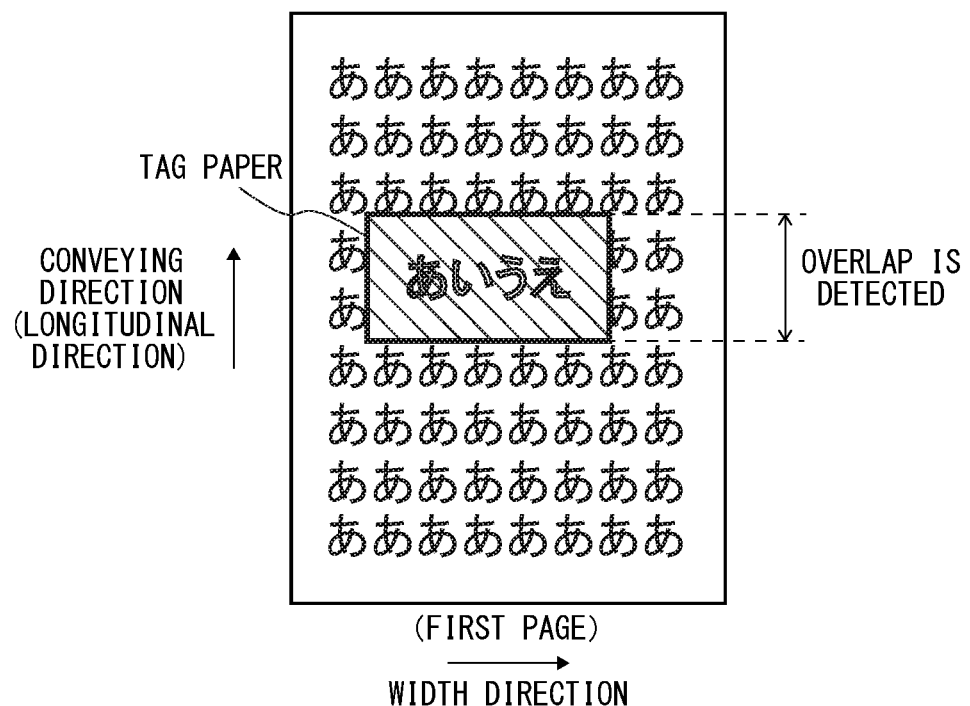
FIG. 5 is an explanatory drawing showing an example of documents used in the scanning operation, in which tag papers are stuck on the documents and characters are written on the tag papers, in the multifunction peripheral according the first embodiment of the present disclosure.
Figure 5:
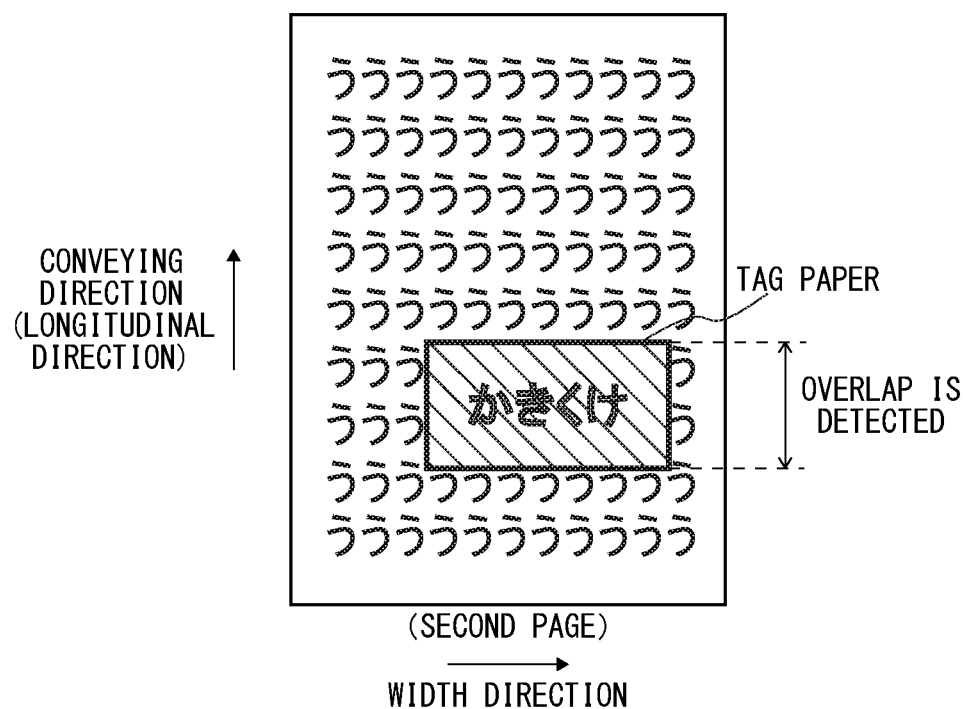

Moreover, the double feed deciding part 52 may perform predetermined image processing to the overlap image composed of the plurality of pixels within the predetermined range, and then, may store the overlap image as the preservation image or compare the overlap image with the preservation image. For example, although the tag papers of the same kind are stuck on two documents shown in FIG. 5, characters written on the tag papers are different. In a case of performing the scanning operation to these documents, even if the overlap image corresponding to the tag paper on the document of a first page is stored as the preservation image, because the overlap image corresponding to the tag paper on the document of a second page is different from the preservation image in the written characters, the overlap image of the second page is decided so as to not match with the preservation image.

Thereupon, the double feed deciding part 52 may perform character recognition processing with regard to the overlap image and, in a case where a character is detected from the overlap image, the double feed deciding part 52 may fill data corresponding to a part of the character with data (color data) of the same kind as the pixel around the character to create the overlap image in which the character is deleted.

Alternatively, the double feed deciding part 52 may identify the color of the overlap image by the most color data among the plurality of pixels composing the overlap image. For example, in the tag papers stuck on two documents shown in FIG. 5, because areas of the characters are clearly smaller than areas of background, the overlap images detected from these documents have the most color data in the areas of background and are identified by the colors of the areas of background, i.e. original colors of the tag paper.

Subsequently, in a case where the overlap image does not match with the preservation image (step S7: NO in FIG. 4), the double feed deciding part 52 decides that the overlap of the document is the double feed (step S8 in FIG. 4). On the other hand, in a case where the overlap image matches with the preservation image (step S7: YES in FIG. 4), the double feed deciding part 52 decides that the overlap of the document is not the double feed (step S9 in FIG. 4).

Incidentally, the double feed deciding part 52 (or the controlling part 50) may decide establishment of matching in a case where the overlap image and the preservation image are perfectly matched or in a case where the overlap image and the preservation image are matched within a predetermined similar allowable range. Incidentally, such a similar allowable range may be varied in accordance with magnitude of each value of RGB data in a case where the overlap image and the preservation image are designated by chromatic color fill data. For example, when red data, green data and blue data have the respective values on the same level, the similar allowable ranges respectively corresponding to red, green and blue may set on the same level. When one color value of the RGB data is larger than the other color values of the RGB data, the similar allowable range corresponding to one color may set relatively wide and the similar allowable ranges corresponding to the other colors may set relatively narrow. Moreover, in a case where the overlap image and the preservation image are designated by images having a regular pattern of chromatic color, if the respective patterns of the overlap image and the preservation image are matched, it may be decided that the overlap image and the preservation image are within the similar allowable range.

When the double feed deciding part 52 decides that the overlap of the document is the double feed (step S8 in FIG. 4), the double feed deciding part 52 stops the scanning operation, such as document conveying in the document conveying part 7 and image reading in the image reading part 6, and notifies the double feed of the document to the user, for example, by using a speaker (not shown) or the operation display part 8. At this time, the double feed deciding part 52 displays, on the operation display part 8, an inquiry screen for inquiring user judgement whether the user approves or disapproves double feed deciding of the document. Moreover, the double feed deciding part 52 may display the image data created by the image reading part 6 on the inquiry screen of the operation display part 8.

When, on the inquiry screen of the operation display part 8, the user judges that the overlap is the double feed and selects approval of double feed deciding (step S10: YES in FIG. 4), re-performing of the scanning operation is carried out (step S11 in FIG. 4), and then, the double feed deciding part 52 (or the controlling part 50) deletes the image data at the time of the double feed without applying it into a result of the scanning operation, directs to place the document decided as the double feed on the supply tray 30, and re-performs the scanning operation. At this time, the double feed deciding part 52 also deletes the overlap image used for double feed deciding.

Alternatively, on the inquiry screen of the operation display part 8, the user judges that the overlap is not the double feed and selects disapproval of double feed deciding (step S10: NO in FIG. 4), re-performing of the scanning operation is not carried out, and then, the double feed deciding part 52 (or the controlling part 50) applies the image data at the time of the double feed as it is into the result of the scanning operation, and stores the overlap image used for double feed deciding as a new preservation image in the storing part 51 (step S12 in FIG. 4). For example, in a case where the overlap of the document is overlap due to the tag paper, because the user judges that the overlap is not the double feed, a new preservation image on the basis of the overlap image corresponding to the tag paper is stored. Subsequently, if there is the following document (step S13: YES in FIG. 4), the scanning operation of the following document is performed.

On the other hand, when the double feed deciding part 52 decides that the overlap of the document is not the double feed (step S9 in FIG. 4), it is necessary to stop the scanning operation of the following document and to notify the double feed of the document to the user. At this time, the double feed deciding part 52 deletes the overlap image used for double feed deciding. Subsequently, if there is the following document (step S13: YES in FIG. 4), the scanning operation of the following document is performed.

Incidentally, in the first embodiment, double feed deciding in the double feed deciding part 52 may be performed even if any of monochrome image reading and color image reading is set as setting condition.

Moreover, in the first embodiment, the preservation image stored in the storing part 51 may be accumulated in the storing part 51 or be deleted from the storing part 51 for each scanning operation of one job, i.e. whenever the image data file is created. Further, in a case where the multifunction peripheral 1 or the document reading device 5 is configured so as to become available by logging-in of the user, the double feed deciding part 52 may stores the preservation image in the storing part 51 in association with the logged-in user (user information or login information). In such a case, the preservation image in association with the user is used for double feed deciding in the double feed deciding part 52 when this user is logged in. In other words, when the double feed deciding part 52 performs double feed deciding, the double feed deciding part 52 reads out the preservation image associated with the logged-in user from the storing part 51 and uses this preservation image in this double feed deciding.

In accordance with the first embodiment, as described above, the document reading device 5 includes the image reading part 6, the document conveying part 7, the operation display part 8 (the operation part), the overlap detecting part 41 and the double feed deciding part 52 (or the controlling part 50). The image reading part 6 reads the document in the scanning operation to obtain the image data. The document conveying part 7 conveys the document to the image reading part 6 in the scanning operation. The operation display part 8 receives or accepts operation of the user. The overlap detecting part 41 detects the overlap of the document conveyed to the image reading part 6. When the overlap detecting part 41 detects the overlap of the document, in a case where the overlap image corresponding to the overlap of the document in the image data obtained from the document by the image reading part 6 matches with a predetermined preservation image, the controlling part 50 decides that the overlap of the document is not the double feed to continue the scanning operation. On the other hand, in a case where the overlap image corresponding to the overlap of the document in the image data obtained from the document by the image reading part 6 does not match with the predetermined preservation image, the controlling part 50 decides that the overlap of the document is the double feed, stops the scanning operation, and further, if the user judgement that the overlap of the document is not the double feed is inputted in accordance with operation of the operation display part 8, the controlling part 50 stores the preservation image on the basis of the overlap image.

Thereby, in a case where the tag paper or the like is stuck on the document, even if the overlap detecting part 41 detects the overlap of the document, the user can judge that the overlap is not the double feed, and then, even if the same overlap is detected after that, the same overlap is not decided as the double feed. Therefore, it is possible to conform double feed decision to intention of the user and to restrain that the tag paper stuck on the document is detected as the double feed. Accordingly, it is possible to omit labor of confirming the document by the user, and double feed detection and stop of the scanning operation are not caused for each document on which the tag paper is stuck. Thus, it is possible to restrain time and labor of the user required for double feed detection of the document, and to appropriately decides the double feed of the document.

Figure 6:
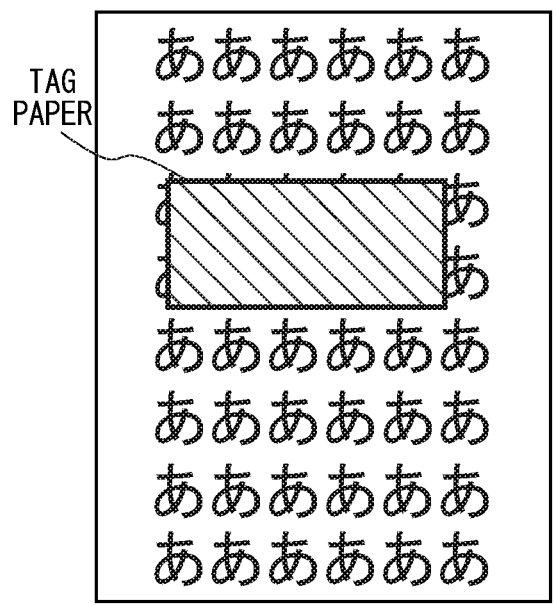
FIG. 6 is an explanatory drawing showing an example of documents used in the scanning operation, in which the same tag papers are stuck on the different documents, in the multifunction peripheral according the first embodiment of the present disclosure.
Figure 6:
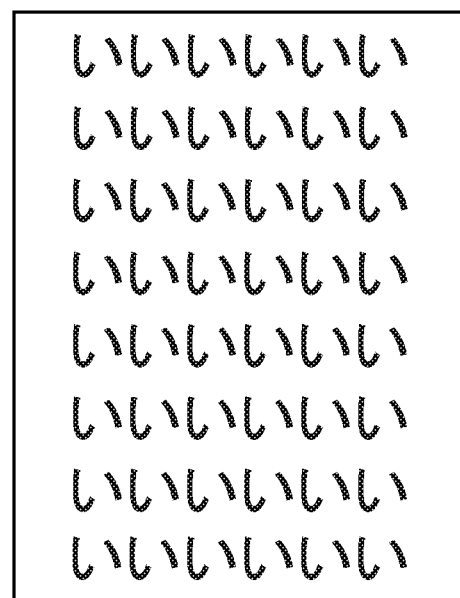
Figure 6:
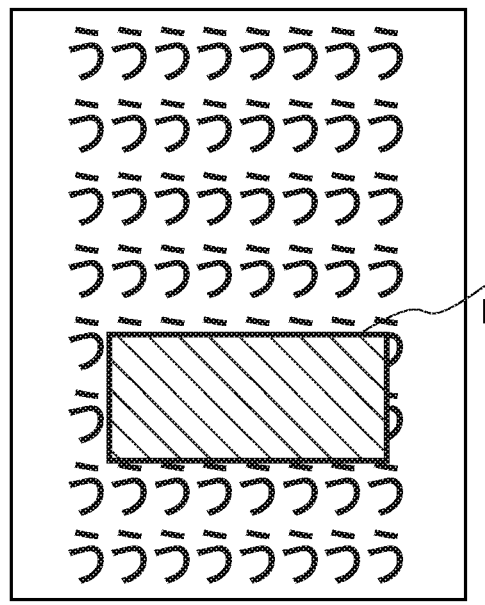
Figure 6:
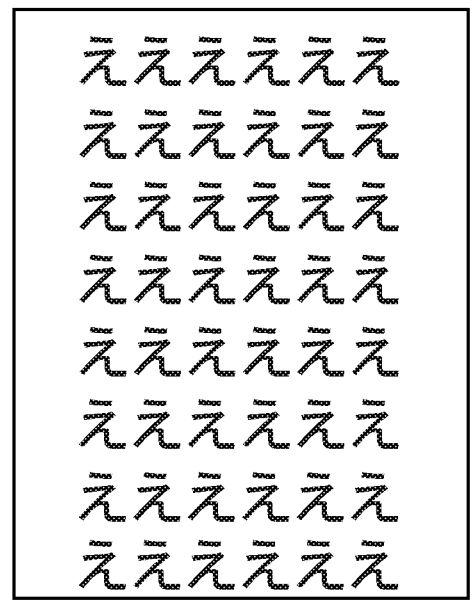

For instance, an example that the document reading device 5 performs the scanning operation of one job with regard to the documents of four pages in all as shown in FIG. 6, in which the same tag papers are stuck on the document of the first page and the document of the third page, will be described hereinafter.

Figure 7:
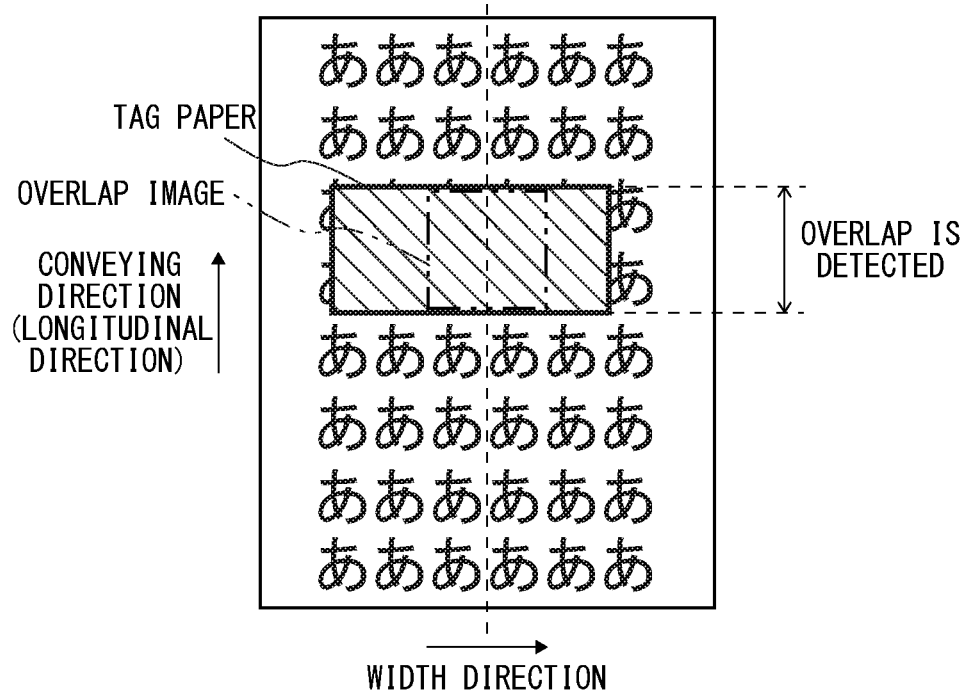
FIG. 7 is an explanatory drawing showing an example of the first document in FIG. 6 and an overlap image extracted from an image of the tag paper on the first document in the multifunction peripheral according the first embodiment of the present disclosure.

First, in the scanning operation of the document of the first page, the overlap detecting part 41 detects the tag paper as the overlap and the double feed deciding part 52 extracts the overlap image corresponding to the tag paper as shown in FIG. 7 from the image data of the document of the first page. In a case where the preservation image is not yet stored in the storing part 51, the double feed deciding part 52 decides that the overlap of the tag paper is the double feed, stops the scanning operation, and displays the inquiry screen for the user judgement on the operation display part 8. Here, if the user judges the overlap is not the double feed and inputs such a judgement to the document reading device 5 via the inquiry screen, the preservation image on the basis of the overlap image about the tag paper of the first page is stored in the storing part 51. Incidentally, because the user judgement that the overlap is not the double feed is inputted, the image data is applied as it is into the result of the scanning operation and the scanning operation is restarted.

Figure 8:
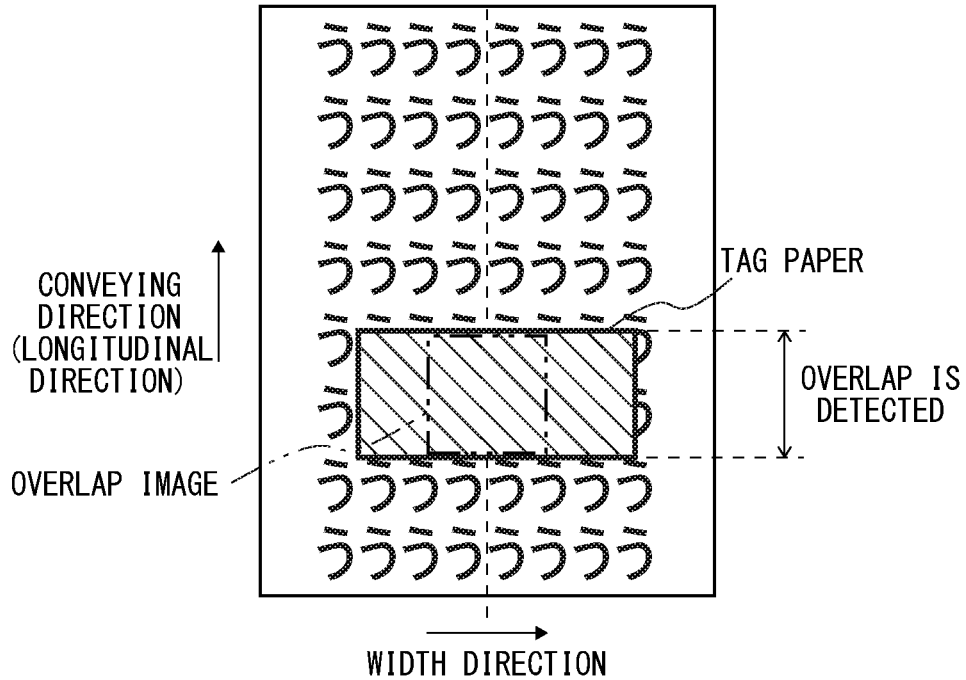
FIG. 8 is an explanatory drawing showing an example of the third document in FIG. 6 and an overlap image extracted from an image of the tag paper on the third document in the multifunction peripheral according the first embodiment of the present disclosure.

Next, in the scanning operation of the document of the second page, because the tag paper is not stuck, double feed decision is not performed, and the image data is created and applied as it is into the result of the scanning operation. However, in the scanning operation of the document of the third page, the overlap detecting part 41 detects the tag paper as the overlap. Here, the double feed deciding part 52 extracts the overlap image corresponding to the tag paper as shown in FIG. 8 from the image data of the document of the third page, and compares the extracted overlap image with the preservation image stored in the storing part 51. In this comparison, since the tag papers of the first page and the third page are the same kind, it is decided that the overlap image and the preservation image are matched, it is decided that the overlap of the tag paper of the third page is not the double feed, and the image data is applied as it is into the result of the scanning operation.

Subsequently, in the scanning operation of the document of the fourth page, because the tag paper is not stuck, double feed decision is not performed, and the image data is created and applied as it is into the result of the scanning operation. Thus, image reading of all the documents is completed, and the image data file is created by using the image data of the documents of the first to fourth pages. At this time, the preservation image stored in the storing part 51 may be deleted or may be stored in association with the logged-in user.

Figure 9:
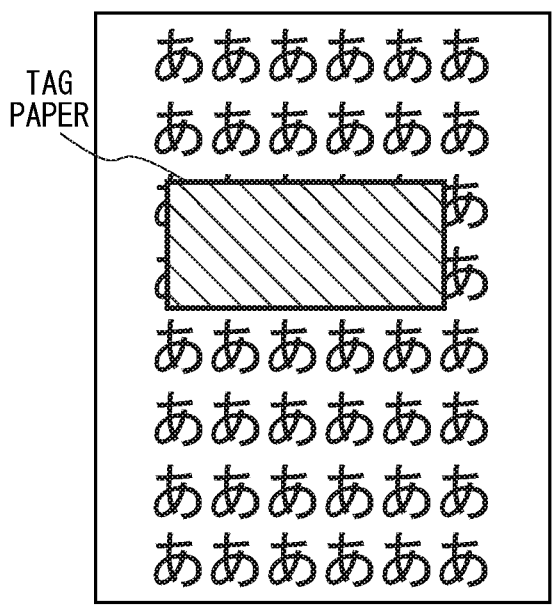
FIG. 9 is an explanatory drawing showing an example of documents used in the scanning operation, in which different tag papers are respectively stuck on the different documents, in the multifunction peripheral according the first embodiment of the present disclosure.
Figure 9:
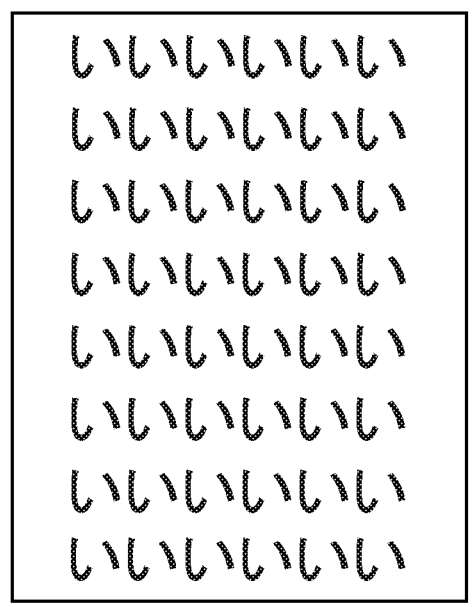
Figure 9:
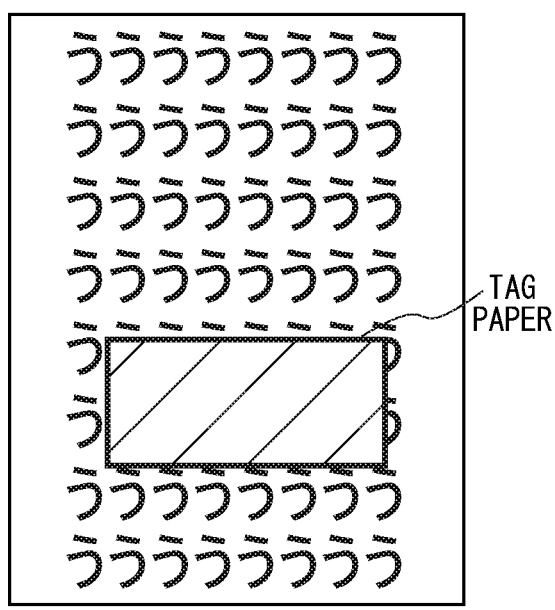
Figure 9:
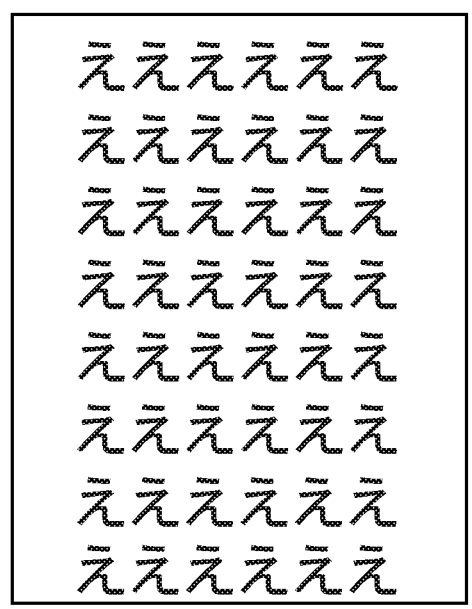

Moreover, an example that the document reading device 5 performs the scanning operation of one job with regard to the documents of four pages in all as shown in FIG. 9, in which the different tag papers are stuck on the document of the first page and the document of the third page, will be described hereinafter.

Similar to the above-described example, in the document reading device 5, in the scanning operation of the document of the first page, the preservation image on the basis of the overlap image corresponding to the tag paper of the first page as shown in FIG. 7 is stored in the storing part 51, and the image data is applied as it is into the result of the scanning operation. Next, in the scanning operation of the document of the second page, because the tag paper is not stuck, double feed decision is not performed, and the image data is created and applied as it is into the result of the scanning operation.

Figure 10:
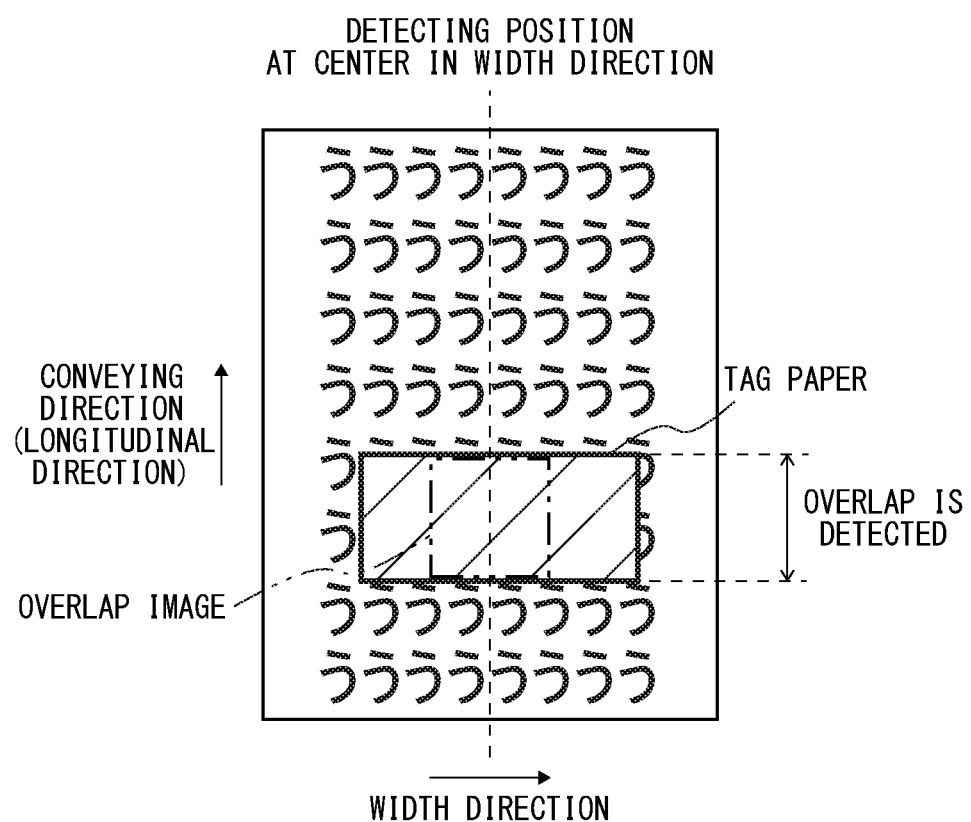
FIG. 10 is an explanatory drawing showing an example of the third document in FIG. 9 and an overlap image extracted from an image of the tag paper on the third document, being different from the tag paper on the first document, in the multifunction peripheral according the first embodiment of the present disclosure.

Subsequently, in the scanning operation of the document of the third page, the overlap detecting part 41 detects the tag paper being different from the first page as the overlap. Here, the double feed deciding part 52 extracts the overlap image corresponding to the tag paper as shown in FIG. 10 from the image data of the document of the third page, and compares the extracted overlap image with the preservation image stored in the storing part 51. In this comparison, since the tag papers of the first page and the third page are different kinds, it is decided that the overlap image and the preservation image are not matched, the double feed deciding part 52 decides that the overlap of the tag paper of the third page is the double feed, stops the scanning operation, and displays the inquiry screen for the user judgement on the operation display part 8.

Here, if the user judges the overlap is not the double feed and inputs such a judgement to the document reading device 5 via the inquiry screen, the preservation image on the basis of the overlap image about the tag paper of the third page is stored in the storing part 51 in addition to the tag paper of the first page. Incidentally, because the user judgement that the overlap is not the double feed is inputted, the image data is applied as it is into the result of the scanning operation and the scanning operation is restarted.

Subsequently, in the scanning operation of the document of the fourth page, because the tag paper is not stuck, double feed decision is not performed, and the image data is created and applied as it is into the result of the scanning operation. Thus, image reading of all the documents is completed, and the image data file is created by using the image data of the documents of the first to fourth pages. At this time, all the preservation images stored in the storing part 51 may be deleted or may be stored in association with the logged-in user.

In accordance with the first embodiment, in the document reading device 5, in a state that a predetermined user is logged in, in a case where the user judgement that the detected overlap of the document is not the double feed is inputted, the double feed deciding part 52 (or the controlling part 50) stores the preservation image in association with the logged-in user.

Thereby, by storing the preservation image for each user, it is possible to perform double feed decision suitable for each user. For example, different users may use different tag papers, but one user often uses the tag paper of the same kind for the respective scanning operations of the different jobs, and then, the tag papers of the same kind causes detection of the overlap. However, if the user decides in the precious job that the tag paper is not applicable to the double feed and the preservation image about the decided tag paper is accumulated, even if the tag paper of the same kind is used in the following job, the following tag paper is not decided as the double feed, and accordingly, it is possible to omit labor of confirming the document by the user.

Moreover, in accordance with the first embodiment, in the document reading device 5, the double feed deciding part 52 (or the controlling part 50) creates the preservation image with deleting a character from the overlap image in a case where the overlap image includes the character.

Thereby, regardless of the character written in the tag paper, it is possible to compare appropriately the overlap image and the preservation image.

Although, in the first embodiment, an example that the double feed deciding part 52 decides, when the overlap image corresponding to the overlap of the document matches with the predetermined preservation image, that the overlap of the document is not the double feed, is described, the present disclosure is not limited by this example. For example, in a second embodiment of the disclosure, the double feed deciding part 52 may decide, in a case where the overlap image is a chromatic color image, that the overlap of the document is not the double feed.

Figure 11:
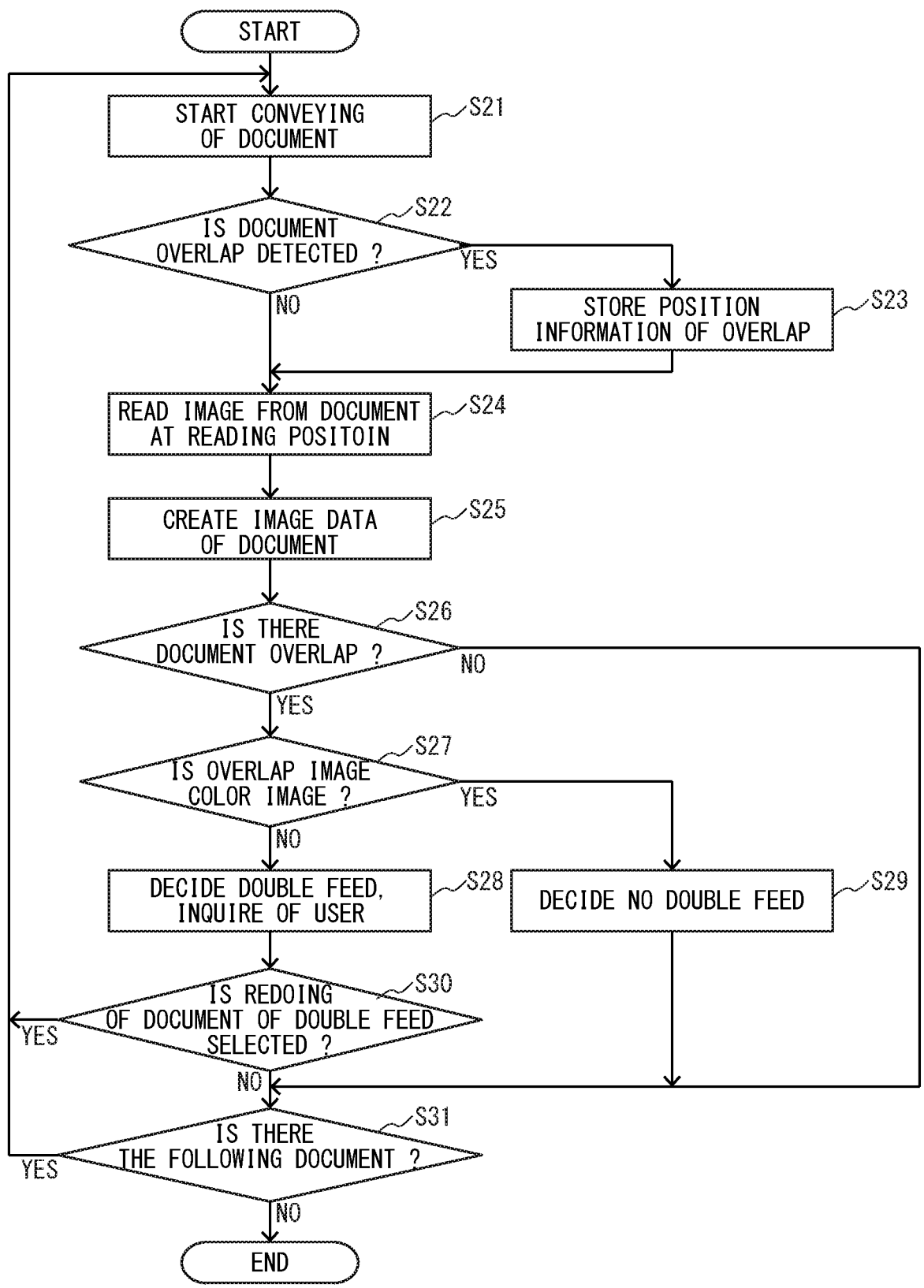
FIG. 11 is a flow chart showing scanning operation in the multifunction peripheral according a second embodiment of the present disclosure.

In the second embodiment, the document reading device 5 and multifunction peripheral 1 including the document reading device 5 is configured similar to the first embodiment, but the double feed deciding part 52 in the second embodiment has similarities and differences to the first embodiment. Hereinafter, the second embodiment will be described with reference to FIGS. 11-14, particularly, similarities and differences of the double feed deciding part 52 to the first embodiment will be described. Incidentally, in the second embodiment, conveying of the document in the document conveying part 7 (step S21 in FIG. 11), detecting of the overlap of the document in the document detecting part 40 (step S22 in FIG. 11), storing of the position information of the overlap (step S23 in FIG. 11), image reading of the document in the image reading part 6 (step S24 in FIG. 11) and creating of the image data (step S25 in FIG. 11) are similar to steps S1, S2, S3, S4 and S5 in FIG. 4 in the first embodiment.

Similar to the first embodiment, the controlling part 50 in the second embodiment works as the double feed deciding part 52 by executing the program stored in the storing part 51. Double feed deciding in the double feed deciding part 52 is included in the scanning operation. Incidentally, in the second embodiment, it is necessary to store the above-described preservation image in the storing part 51.

Similar to the first embodiment, the double feed deciding part 52 in the second embodiment grasps passage of the document at the detecting position of the overlap detecting part 41 on the basis of the detection signal of the document detecting part 40 at the upstream side from the reading position. The double feed deciding part 52 measures the elapsed time after the leading end of the document is passed through the detecting position of the overlap detecting part 41, and calculates the distance from the leading end of the document to the detecting position in the conveying direction (the longitudinal direction) on the basis of the elapsed time, i.e., calculates the position information on the document corresponding to the detecting position of overlap detecting part 41.

Moreover, the double feed deciding part 52 grasps the overlap of the document on the basis of the detection signal of the overlap detecting part 41 and, in a case where the overlap is detected (step S22: YES in FIG. 11), stores the position information (positions in the width direction and the longitudinal direction) of the overlap in the storing part 51. Incidentally, the position information in the longitudinal direction is calculated as described above, and the position information in the width direction is grasped in accordance with which overlap detecting part 41 among the plurality of overlap detecting parts 41 arranged side by side in the width direction detects the overlap. In a case where the overlaps are continuously detected, the double feed deciding part 52 may decide a plurality of continuing overlaps as one overlap.

Further, when, with regard to one document (irrespective of whether or not double feed is caused), document conveying in the document conveying part 7 and image reading in the image reading part 6 are completed and the image data is created (steps S24 and S25 in FIG. 11), in a case where the overlap is detected from the document (step S26: YES in FIG. 11), the double feed deciding part 52 decides on the basis of the image data whether or not the overlap of the document is applicable to the double feed. At this time, the double feed deciding part 52 calculates the overlap position on the image data corresponding to the overlap on the basis of the position information of the overlap stored in the storing part 51. Incidentally, in a case where the plurality of continuing overlaps are detected, the position information of the overlap at the center may be set as the overlap position.

Unlike the first embodiment, the double feed deciding part 52 in the second embodiment does not decide whether or not the partial image data at the overlap position (the overlap image) matches with the preservation image stored in the storing part 51. Instead, the double feed deciding part 52 in the second embodiment decides on the basis of color data (RGB data) of the overlap image whether or not the overlap image is a color image other than white and black (step S27 in FIG. 11). Here, the color image other than white and black is designated by an image painted out with chromatic color other than white and black, an image having a high ratio of chromatic color other than white and black or the like. Incidentally, the overlap image may be only a pixel at the overlap position, or may include pixels within a predetermined range in the conveying direction and the width direction around the overlap position in addition to the pixel at the overlap position. A color of the overlap image composing a plurality of pixels within the predetermined range may be identified by the most color data among the pixels, or may be identified by an averaged value of the respective color data among the pixels.

Subsequently, when the overlap image is not the color image other than white and black (step S27: NO in FIG. 11), the double feed deciding part 52 decides that the overlap of the document is the double feed (step S28 in FIG. 11). On the other hand, when the overlap image is the color image other than white and black (step S27: YES in FIG. 11), the double feed deciding part 52 decides that the overlap of the document is not the double feed (step S29 in FIG. 11). The tag paper is often colored with chromatic color other than white and black against the document colored with white or black in order to be distinguished from the document, and the overlap due to the tag paper is detected by a color image other than white and black.

When the double feed deciding part 52 decides that the overlap of the document is the double feed (step S28 in FIG. 11), the double feed deciding part 52 stops the scanning operation, such as document conveying in the document conveying part 7 and image reading in the image reading part 6, and notifies the double feed of the document to the user, for example, by using a speaker (not shown) or the operation display part 8. At this time, the double feed deciding part 52 preferably displays, on the operation display part 8, an inquiry screen for making the user selected redoing (performing the scanning operation again) or not-redoing (applying the image data at the time of the double feed as it is). Moreover, the double feed deciding part 52 may display the image data created by the image reading part 6 on the inquiry screen of the operation display part 8.

On the inquiry screen of the operation display part 8, in a case where redoing is selected (step S30: YES in FIG. 11), the double feed deciding part 52 (or the controlling part 50) directs to place the document decided as the double feed on the supply tray 30, and re-performs the scanning operation. Alternatively, in a case where not-redoing is selected (step S30: NO in FIG. 11), if there is the following document (step S31: YES in FIG. 11), the scanning operation of the following document is performed.

On the other hand, when the double feed deciding part 52 decides that the overlap of the document is not the double feed (step S29 in FIG. 11), because it is possible to judge the overlap due to the tag paper, it is necessary to stop the scanning operation of the following document and to notify the double feed of the document to the user. Subsequently, if there is the following document (step S31: YES in FIG. 11), the scanning operation of the following document is performed.

Incidentally, in the second embodiment, double feed deciding in the double feed deciding part 52 is preferably performed when monochrome image reading is set as setting condition, but double feed deciding may be performed when color image reading is set as setting condition.

In accordance with the second embodiment, as described above, the document reading device 5 includes the image reading part 6, the document conveying part 7, the overlap detecting part 41 and the double feed deciding part (or the controlling part 50). The image reading part 6 reads the document in the scanning operation to obtain the image data. The document conveying part 7 conveys the document to the image reading part 6 in the scanning operation. The overlap detecting part 41 detects the overlap of the document conveyed to the image reading part 6. When the overlap detecting part 41 detects the overlap of the document, in a case where the overlap image corresponding to the overlap of the document in the image data obtained from the document by the image reading part 6 is not the color image other than white and black, the controlling part 50 decides that the overlap of the document is the double feed. On the other hand, in a case where the overlap image is the color image other than white and black, the controlling part 50 decides that the overlap of the document is not the double feed.

Figure 12:
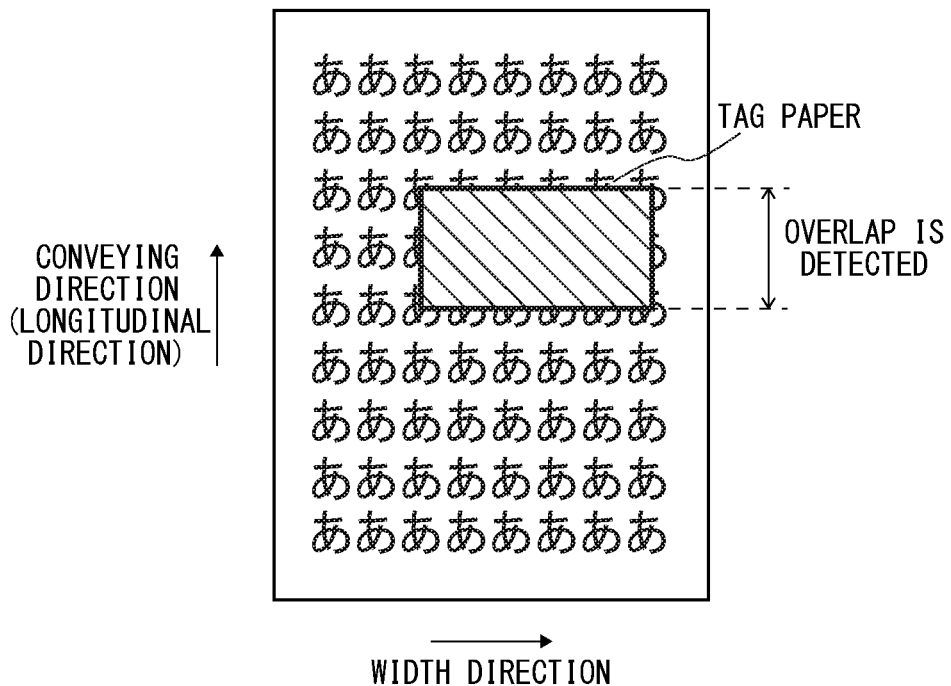
FIG. 12 is an explanatory drawing showing an example of a document used in the scanning operation in the multifunction peripheral according the first embodiment of the present disclosure.

Thereby, as shown in FIG. 12, in a case where the tag paper or the like is stuck on the document, even if the overlap detecting part 41 detects the overlap of the document, it is possible to restrain the tag paper stuck on the document from being erroneously detected as the double feed. Incidentally, since it is possible to restrain erroneous detection of the double feed without moving the overlap detecting part 41, in comparison with a configuration moving the overlap detecting part 41, it is possible to reduce time required for double feed detection, and it is unnecessary to provide a driving part for moving the overlap detecting part 41. Thus, it is possible to restrain time and labor of the user required for double feed detection of the document, and to appropriately decides the double feed of the document.

Moreover, in accordance with the second embodiment, as descried above, in the document reading device 5, when the double feed deciding part 52 (or the controlling part 50) decides that the overlap of the document is the double feed, the double feed deciding part 52 stops the scanning operation of the following document to the present document. On the other hand, when the double feed deciding part 52 decides that the overlap of the document is not the double feed, the double feed deciding part 52 continues the scanning operation of the following document to the present document.

Thereby, in a case where the tag paper or the like is stuck on the document, even if the overlap detecting part 41 detects the overlap of the document, the double feed is not detected and the scanning operation, such as document conveying in the document conveying part 7 and image reading in the image reading part 6, is not stopped, and accordingly, it is possible to omit labor of confirming the document by the user Although, in the second embodiment, an example that, when the overlap image is the color image other than white and black, on the assumption of judging regardless of the color that the overlap is caused by the tag paper, the double feed deciding part 52 decides that the overlap of the document is not the double feed, the present disclosure is not limited by this example.

As the other example, in the second embodiment, the double feed deciding part 52 (or the controlling part 50) registers the color (a tag paper color) of the color image to be decided that it is not the double feed as an exclusion color in the storing part 51 or the like in advance. When the overlap image is not the color image of the exclusion color, the double feed deciding part 52 decides that the overlap of the document is the double feed. On the other hand, when the overlap image is the color image of the exclusion color, on the assumption of judging that the overlap is caused by the tag paper, the double feed deciding part 52 decides that the overlap of the document is not the double feed.

At this time, when the color data (RGB data) of the exclusion color and the overlap image are compared, the double feed deciding part 52 may decide establishment of matching in a case where the color data of the exclusion color and the overlap image are are perfectly matched or in a case where the color data (RGB data) of the exclusion color and the overlap image are matched within a predetermined similar allowable range. Incidentally, such a similar allowable range may be varied in accordance with magnitude of each value of RGB data. For example, when red data, green data and blue data have the respective values on the same level, the similar allowable ranges respectively corresponding to red, green and blue may set on the same level. When one color value of the RGB data is larger than the other color values of the RGB data, the similar allowable range corresponding to one color may set relatively wide and the similar allowable ranges corresponding to the other colors may set relatively narrow.

In accordance with the other example of the second embodiment, as described above, the document reading device 5 registers the exclusion color used for excluding double feed decision of the document in advance, and then, in a case where the overlap image corresponding to the overlap of the document is the color image other than white and black, when the color image is not designated by the exclusion color, decides that the overlap of the document is the double feed, and, on the other hand, when the color image is designated by the exclusion color, decides that the overlap of the document is not the double feed.

Figure 13:
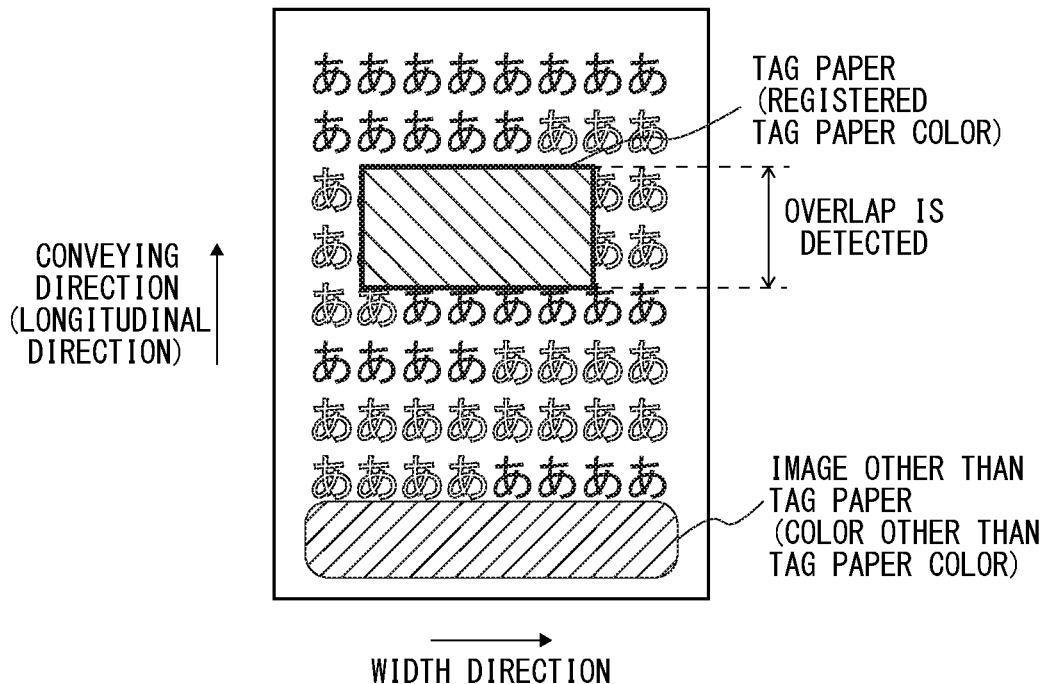
FIG. 13 is an explanatory drawing showing another example of a document used in the scanning operation in the multifunction peripheral according the first embodiment of the present disclosure.
Figure 14:
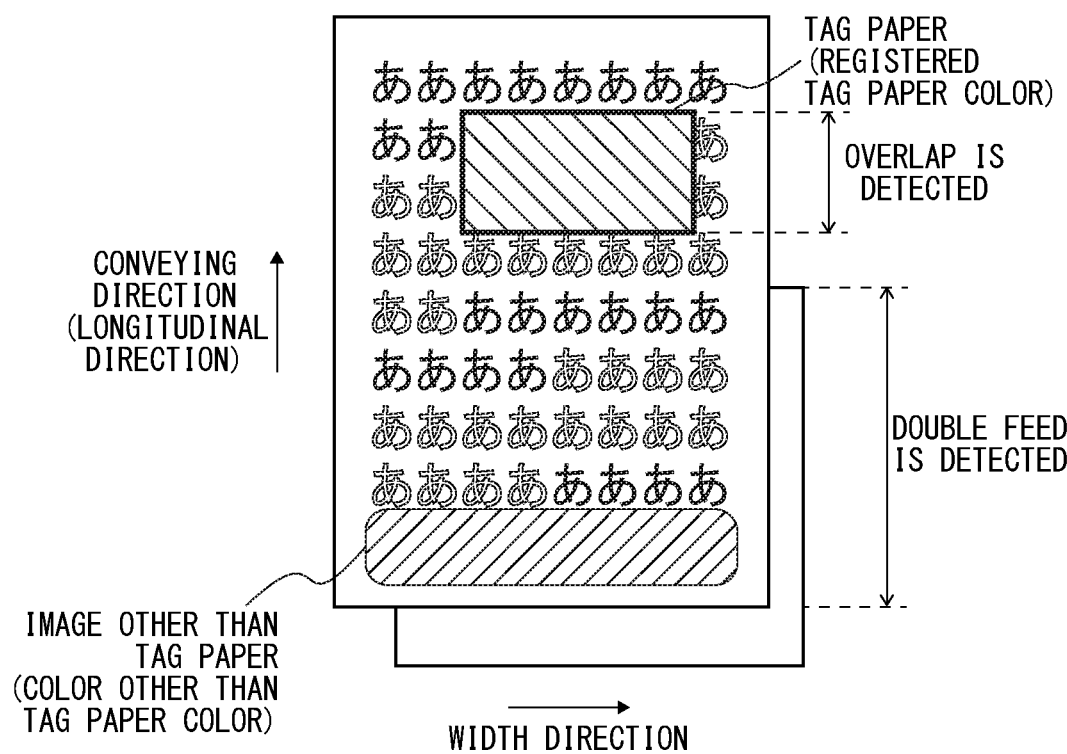
FIG. 14 is an explanatory drawing showing a further example of a document used in the scanning operation in the multifunction peripheral according the first embodiment of the present disclosure.

Thereby, as shown in FIG. 13, by registering the exclusion color in advance, erroneous detection of the double feed is restrained about the tag paper of the exclusion color, and, as shown in FIG. 14, in a case where the double feed is caused in the scanning operation of the document on which the color image is painted, the color image is not erroneously detected as the tag paper and the double feed can be detected. Incidentally, it is preferably to set the exclusion color to a color not used for the color image painted on the document.

Incidentally, although, in the above-described embodiments, an example that the controlling part 50 provided in the multifunction peripheral 1 controls the scanning operation of the document reading device 5, the present disclosure is not limited by this example. For example, in a further example, the other controlling part provided in the document reading device 5 may controls the scanning operation.

Although the above-described embodiments have described about a case applying the configuration of the present disclosure to the document reading device 5 or the multifunction peripheral 1 including this document reading device 5, in a further different embodiment, the configuration of the present disclosure may be applied to another image forming apparatus (e.g. a printer, a copying machine, a facsimile or the like) including the document reading device 5.

The above-description of the embodiment of the present disclosure was described about a preferable embodiment of the document reading device and the image forming apparatus according to the disclosure. However, the technical scope of the present disclosure is not limited to the embodiments.

The invention claimed is:

1. A document reading device comprising:
    an image reading part reading a document in scanning operation to obtain image data;
    a document conveying part conveying the document to the image reading part in the scanning operation;
    an overlap detecting part detecting overlap of the document conveyed to the image reading part; and
    a controlling part, when the overlap detecting part detects the overlap of the document, in a case where an overlap image corresponding to the overlap of the document in the image data obtained from the document by the image reading part is not a color image other than white and black, deciding that the overlap of the document is double feed, and, on the other hand, in a case where the overlap image is the color image other than white and black, deciding that the overlap of the document is not the double feed.

2. The document reading device according to claim 1, wherein the controlling part registers an exclusion color used for excluding double feed decision of the document in advance, and, when the overlap image is the color image, in a case where the color image is not the exclusion color, decides that the overlap of the document is the double feed, and, on the other hand, in a case where the color image is the exclusion color, decides that the overlap of the document is not the double feed.

3. The document reading device according to claim 2, wherein the controlling part, in a case where the color image and the exclusion color are within a predetermined similar allowable range, decides that the color image and the exclusion color are matched.

4. An image forming apparatus comprising:
the document reading device according to claim 3; and
an image forming part forming an image.

5. An image forming apparatus comprising:
the document reading device according to claim 2; and
an image forming part forming an image.

6. The document reading device according to claim 1, wherein the controlling part, when deciding that the overlap of the document is the double feed, stops the scanning operation of the following document to the present document, and, on the other hand, when deciding that the overlap of the document is not the double feed, continues the scanning operation of the following document to the present document.

7. An image forming apparatus comprising:
the document reading device according to claim 6; and
an image forming part forming an image.

8. An image forming apparatus comprising:
the document reading device according to claim 1; and
an image forming part forming an image.

* * * * *